(12) United States Patent
Bai et al.

(10) Patent No.: US 10,890,276 B2
(45) Date of Patent: Jan. 12, 2021

(54) METAL STRIP WINDING CONTINUOUS REINFORCED THERMOPLASTIC COMPOSITE PIPE

(71) Applicant: Ningbo OPR Offshore Engineering Equipment CO., Ltd., Ningbo (CN)

(72) Inventors: Yong Bai, Shenzhen (CN); Chang Liu, Shenzhen (CN); Dewen Zhang, Ningbo (CN); Zongzheng Zhang, Shenzhen (CN)

(73) Assignee: NINGBO OPR OFFSHORE ENGINEERING EQUIPMENT CO., LTD., Ningbo (CN)

( * ) Notice: Subject to any disclaimer, the term of this patent is extended or adjusted under 35 U.S.C. 154(b) by 0 days.

(21) Appl. No.: 16/283,861

(22) Filed: Feb. 25, 2019

(65) Prior Publication Data

US 2020/0103057 A1 Apr. 2, 2020

(30) Foreign Application Priority Data

Sep. 28, 2018 (CN) .......................... 2018 1 1137893

(51) Int. Cl.
  *F16L 9/16* (2006.01)
(52) U.S. Cl.
  CPC .................. *F16L 9/165* (2013.01)
(58) Field of Classification Search
  CPC ....................................................... F16L 9/165
  USPC ...................................... 138/130, 133, 134
  See application file for complete search history.

(56) References Cited

U.S. PATENT DOCUMENTS

| | | | | |
|---|---|---|---|---|
| 1,973,756 A * | 9/1934 | Gish | ...................... | F16L 11/088 138/125 |
| 3,729,028 A * | 4/1973 | Horvath | ................ | F16L 11/088 138/130 |
| 4,402,346 A * | 9/1983 | Cheetham | ............. | F16L 11/083 138/103 |
| 5,052,444 A * | 10/1991 | Messerly | .............. | F16L 11/086 138/103 |
| 5,261,462 A * | 11/1993 | Wolfe | ................... | F16L 11/088 138/129 |
| 6,382,258 B1 * | 5/2002 | Tanaka | .................. | B29C 53/582 138/125 |
| 8,844,580 B2 * | 9/2014 | Jani | ........................ | B29C 53/60 138/129 |

(Continued)

*Primary Examiner* — Craig M Schneider
*Assistant Examiner* — David R Deal
(74) *Attorney, Agent, or Firm* — Bayramoglu Law Offices LLC

(57) ABSTRACT

The present invention discloses a metal strip winding continuous reinforced thermoplastic composite pipe. The present invention adopts a method designed for grouping the winding metal strips to rationally distribute the winding mode of the metal strips, and at the same time, increases the hoop strength and axial strength of the pipe by using the feature of high strength of the metal strips, thereby improving the compressive capacity of the pipe; there is no bonding between the metal strip reinforcement layers, which improves the flexibility of the composite pipe and reduces the relative slippage between the metal strip layers; the production process is simple, and requirements for the equipment investment are small, thereby greatly reducing the manufacturing cost and ensuring the flexibility and seismic resistance of the pipeline.

12 Claims, 2 Drawing Sheets

(56) References Cited

U.S. PATENT DOCUMENTS

| | | | | |
|---|---|---|---|---|
| 8,967,205 B2* | 3/2015 | Kalman | ............... | F16L 11/083 138/134 |
| 2003/0178082 A1* | 9/2003 | Yamaguchi | ............... | B32B 1/08 138/129 |
| 2003/0183293 A1* | 10/2003 | Fraser | .................... | B29C 63/10 138/129 |
| 2014/0251485 A1* | 9/2014 | Chen | ....................... | B32B 37/16 138/137 |

* cited by examiner

METAL STRIP WINDING CONTINUOUS REINFORCED THERMOPLASTIC COMPOSITE PIPE

CROSS REFERENCE TO RELATED APPLICATIONS

This application is based upon and claims priority to Chinese Patent Application No. 201811137893.9, filed on Sep. 28, 2018, the entire contents of which are incorporated herein by reference.

TECHNICAL FIELD

The present invention relates to a reinforced thermoplastic composite pipe, particularly to a metal strip winding continuous reinforced thermoplastic composite pipe.

BACKGROUND

Reinforced thermoplastic composite pipe (RTCP) usually has a three-layer structure, the inner layer is usually a corrosion-resistant, abrasion-resistant thermoplastic pipe, the middle layer is a reinforcement layer for reinforcement, and the outer layer is an outer covering layer for protection; wherein reinforcing fiber ribbons, metal wires, metal strips; glass fiber filaments, glass fiber ribbons are usually used in the reinforcement layer. Because of its high-pressure resistance, corrosion resistance, good flexibility and continuity, and other advantages, RTCP has been widely used in transportation pipelines for oil field(s), municipal water supply, drainage of other liquids, gas material delivery pipelines.

The reinforcement layer of the existing reinforced thermoplastic composite pipe is usually formed by directly stacking and winding a plurality layer of metal strips in a spiral form, and the manufacturing process is relatively simple. Due to the gap formed by winding the metal strips, it is impossible to completely ensure the uniform reinforcement of the pipeline. At the same time, due to the superposition of the gaps between the steel strip winding layers, the diameter of the pipe increases suddenly under the pressure-bearing working conditions, and therefore the designed pressure resistance cannot be guaranteed.

SUMMARY

In order to solve the above technical problems, the present invention designs a metal strip winding continuous reinforced thermoplastic composite pipe.

The present invention adopts the following technical solutions.

A metal strip winding continuous reinforced thermoplastic composite pipe has a three-layer structure including an inner pipe, a metal strip winding reinforcement layer and an outer covering pipe from the inside to the outside. The metal strip winding reinforcement layer includes multi-layer metal strips spirally wound around the outside of the inner pipe along the axial direction of the inner pipe, and a glass fiber reinforcement layer or a high-density PE (polyethylene) layer used for separating the multi-layer metal strips.

The multi-layer metal strips of the metal strip winding reinforcement layer are wound on the outside of the inner pipe in a spiral form along the axial direction of the inner pipe, and the number of winding layers is even. Each layer metal strip of the multi-layer metal strips is spirally wound around the outside of the inner pipe along the axial direction of the pipe to form a gap, and two-layer metal strips are grouped based on the first layer metal strip wound around the outside of the inner pipe. The two-layer metal strips in the first group of metal strips are wound in the same direction, and the middle of the width of the second layer metal strip in the first group of metal strips uniformly covers the gap formed by winding the first layer metal strips. The winding directions of the two layers of metal strips in the second group of metal strips are opposite, and the first layer metal strip in the second group of metal strips is wound opposite to the winding direction of the first group of metal strips. Except for the first group of metal strips, the winding directions of the metal strips in the other groups are opposite, and the two layers of metal strips in the other groups of metal strips are respectively wound opposite to the winding directions of the adjacent metal strips.

Preferably, the multi-layer metal strips of the metal strip winding reinforcement layer, each group of metal strips can be separated by a spiral, overlapping and winding plastic strip or other fiber strip having a certain toughness. The spiral, overlapping and winding plastic strip layer or other fiber strip layer in the metal strip winding reinforcement layer has functions of fixing metal strip winding angle, reducing the friction and relative slip between the metal strip winding layers, and improving the fatigue life of the flexible composite pipe.

Preferably, for the multi-layer metal strips in the metal strip winding reinforcement layer, each layer metal strip of the multi-layer metal strips can be formed by winding the multi-layer metal strips in a continuous, spiral and parallel form along the axial direction of the inner pipe.

Preferably, for the multi-layer metal strips in the metal strip winding reinforcement layer, there is no bonding features such as welding or restraint between each layer metal strip of the multi-layer metal strips, and each layer metal strip can relatively slip.

Preferably, for the multi-layer metal strips in the metal strip winding reinforcement layer, the cross section of the metal strip is rectangular.

Preferably, for the multi-layer metal strips in the metal strip winding reinforcement layer, the width and thickness of the metal strips in each group are the same, and the width and thickness of the metal strips in different groups can be different.

Preferably, for the multi-layer metal strips in the metal strip winding reinforcement layer, the material for making the metal strips can be a carbon steel, a stainless steel or other materials.

Preferably, the glass fiber reinforcement layer or the high-density PE layer of the metal strip winding reinforcement layer is wound or extruded on the outside of the first group of the metal strips.

Preferably, the glass fiber reinforcement layer in the metal strip metal strip winding reinforcement layer is a solid pipe formed by wining and bonding the glass fiber pre-impregnated strip.

Preferably, the high-density PE layer of the metal strip metal strip winding reinforcement layer usually has the functions of good flexibility, corrosion resistance, abrasion resistance, scratch resistance, weather resistance, flame retardancy, antistatic, etc. Materials with specific functions can be selected according to the characteristics of the transmission medium or the external environment, such as polyethylene (PE), polypropylene (PP), polyethylene of raised temperature resistance (PERT), polyamide (PA) and other thermoplastic materials.

Preferably, the metal strip winding reinforcement layer is located inside the outer covering pipe and is wrapped by spiral, overlapping and winding plastic strips or other fiber ribbons. This arrangement has the functions of not only fixing the metal strip winding angle, radially restraining and winding the metal strip, reducing the friction and relative slip between the metal strip winding layers, improving the fatigue life of the flexible composite tube, but also assisting the molding and diameter control of the outer covering pipe.

Preferably, there are no bonding features between the metal strip winding reinforcement layer and the inner pipe and the outer covering pipe, and the metal strips can slip.

Preferably, the inner pipe and the outer covering pipe are thermoplastic pipes. Thermoplastic pipes usually have the functions of good softness, corrosion resistance, abrasion resistance, scratch resistance, weather resistance, flame retardancy, antistatic, etc. Materials with specific functions can be selected according to the characteristics of the transport medium or the external environment, such as polyethylene (PE), polypropylene (PP), polyethylene of raised temperature resistance (PERT), polyamide (PA) and other thermoplastic materials.

Beneficial effects of the present invention are as follows: the present invention adopts a method designed for grouping the winding metal strips to rationally distribute the winding mode of metal strip(s). Moreover, by adding a glass fiber reinforcement layer or a high-density PE layer between groups of the metal strip, the superposition of the gaps between the metal layers is reduced, the pressure resistance of the pipe material is ensured, and the pressure resistance of the pipe material is improved at the same time; and there is no bonding between the metal strip reinforcement layers, therefore the flexibility of the composite pipe is improved. Thus, the metal strip winding continuous reinforced thermoplastic composite pipe can be applied to the marine oil and gas transmission pipelines.

In the figures: 1 thermoplastic polymer inner pipe; 2 first layer steel strip in the first group of steel strips; 3 second layer steel strip in the first group of steel strips; 4, 8, and 11 spiral winding plastic strip layer or other fiber strip layer; 5 glass fiber reinforcement layer or high-density PE layer; 6 first layer steel strip in the second group of steel strips; 7 second layer steel strip in the second group of steel strips; 9 first layer steel strip in the third group of steel strips; 10 second layer steel strip in the third group of steel strips; 12 outer protective pipe; 2-1, 3-1, 6-1, 7-1, 9-1 and 10-1 steel strip winding gap.

DETAILED DESCRIPTION OF THE EMBODIMENTS

The technical solutions of the present invention will be further described in detail below through specific embodiments and with reference to the drawings:

Embodiments

Figure 1:
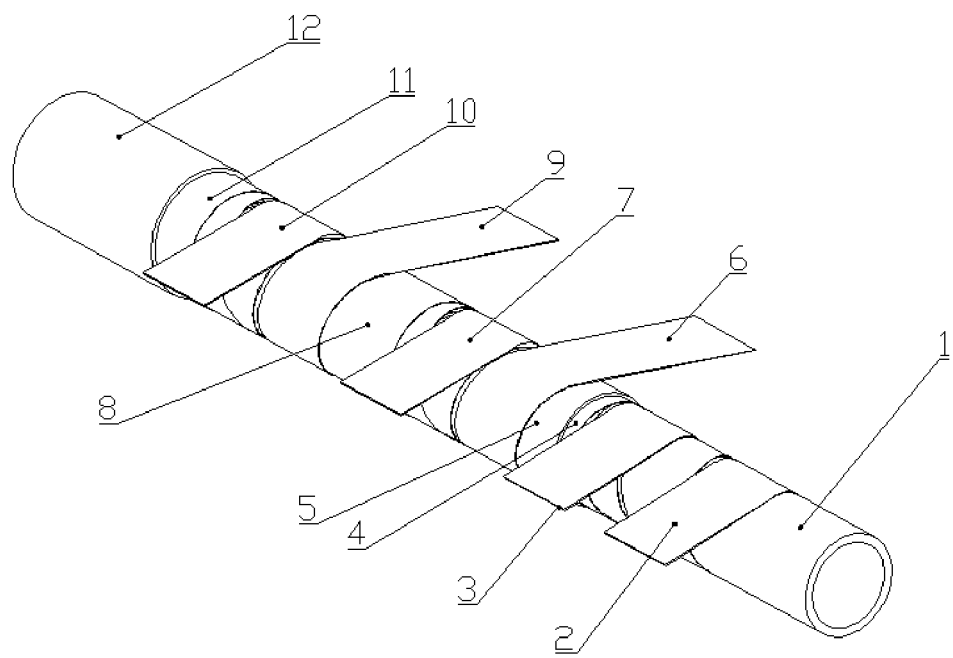
FIG. 1 is a structural diagram of the metal strip winding continuous reinforced thermoplastic composite pipe of the present invention.
Figure 2:
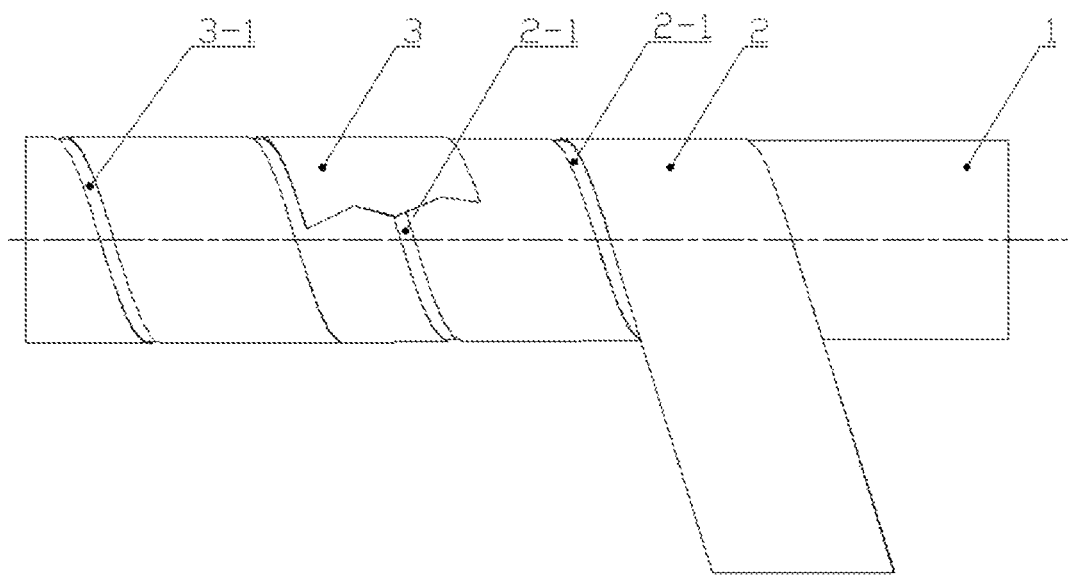
FIG. 2 is a structural diagram of a winding mode of a first group of metal strips.
Figure 3:
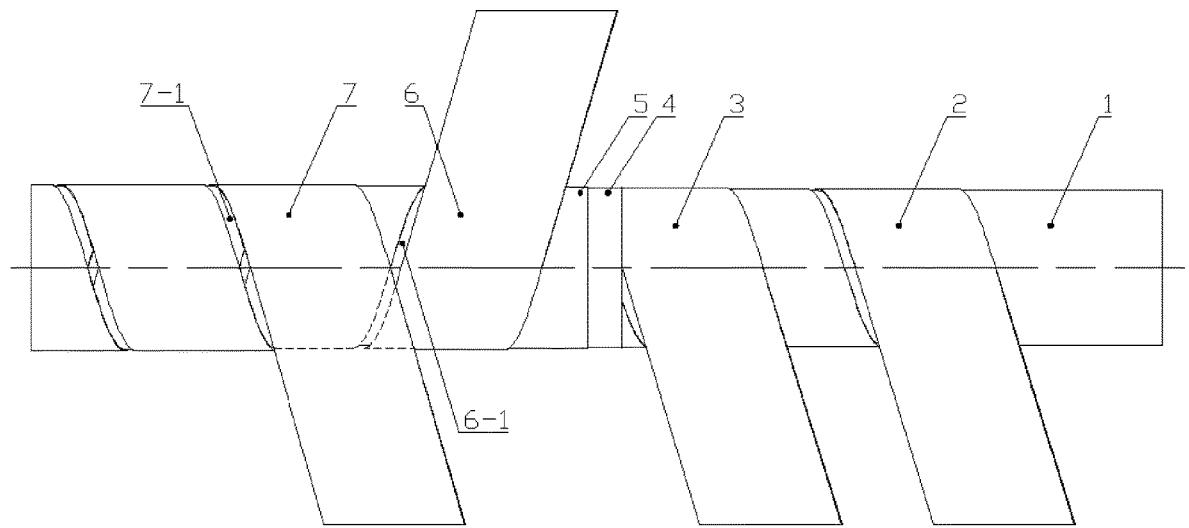
FIG. 3 is a structural diagram of a winding mode of a second group of metal strips.
Figure 4:
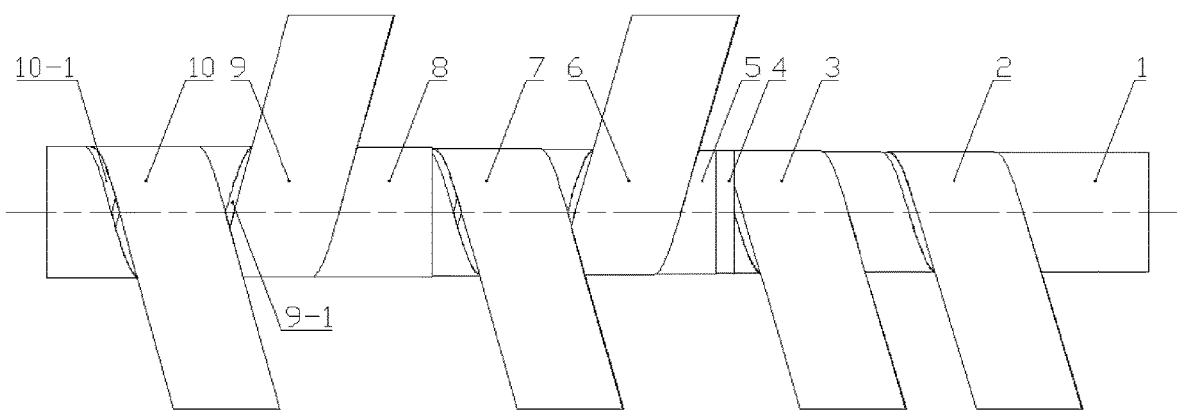
FIG. 4 is a structural diagram of a winding mode of a third group of metal strips.

As shown in FIGS. 1-4, a metal strip winding continuous reinforced thermoplastic composite pipe, using steel strip as metal strip, is a six-layer steel strip winding continuous reinforced thermoplastic composite pipe. This composite pipe includes an inner pipe 1 in the innermost layer, a metal strip winding reinforcement layer in the middle layer and an outer covering pipe 12 in the outermost layer from the inside to the outside. The metal strip winding reinforcement layer is formed through winding the multi-layer steel strips 2, 3, 6, 7, 9 and 10, glass fiber reinforcement layer 5 and the polyester functional layers 4, 8, and 11 in a spiral form. The inner pipe and the outer covering pipe are high-density polyethylene (HDPE) plastic pipes, which not only have strong flexibility, but also have the functions of corrosion resistance, abrasion resistance, scratch resistance, weather resistance, flame retardancy, antistatic, etc.

The metal strip winding reinforcement layer is formed through winding multi-layer steel strips in a spiral form along the axial direction of the pipe. Each layer of steel strips is spirally wound along the axial direction of the inner pipe to form gaps 2-1, 3-1, 6-1, 7-1, 9-1 and 10-1. Two-layer steel strips are grouped based on the first layer steel strip 2 wound around the outer layer of the inner pipe. The two layers of metal strips 2 and 3 in the first group of steel strips are wound in the same direction, and the middle of the width of the second layer spirally wound steel strip 3 uniformly covers the gaps formed by winding the adjacent steel strip 2 on the same circumference. Each group of steel strips are separated by a spiral, overlapping and winding polyester strip layers 4 and 8. The polyester strip layers have functions of fixing steel strip winding layer angle, reducing the friction and relative slip between the steel strip winding layers, and improving the fatigue life of the flexible composite pipe. On the outside of the polyester strip 4, glass fiber reinforcement layer 5, i.e., a solid pipe formed by wining and bonding the glass fiber pre-impregnated strip is wound. The second group of steel strips are wound around outside of the glass fiber reinforcement layer 5, wherein the two layers 6 and 7 of steel strips are wound opposite to each other, and are respectively opposite to the winding directions of the adjacent steel strip, that is, the steel strips 6 and 3 are wound opposite to each other, and the steel strips 7 and 9 are wound opposite to each other. The two layers of steel strips 9 and 10 in the third group of steel strips are wound opposite to each other, and at the same time, opposite to the winding direction of the adjacent steel strip, that is, the steel strips 9 and 7 are wound opposite to each other. Each layer of steel strips is formed by winding a steel strip in a continuous and spiral form along the axial direction of the pipe. There are no bonding features such as welding or restraint between each layer of steel strips, and the steel strips can slip. The cross section of the steel strip is rectangular. The specifications of the steel strips in each group, i.e., the width and thickness, are the same, and the specifications of the steel strips in different groups can be different. The steel strip is made of stainless steel 316L and has anti-corrosion function. Each group of steel strips are separated by the spiral, overlapping and winding polyester strip layers 4, 8 and 11 having functions of fixing metal strip winding layer angle, reducing the friction and relative slip between the metal strip winding layers, and improving the fatigue life of the flexible composite pipe. The outermost layer of the reinforcement layer wrapped with a spiral, overlapping and winding polyester strip layer 11 that has the function of assisting the molding and diameter control of the outer protective pipe. The above-mentioned steel strip winding continuous reinforced thermoplastic pipe do not have the bonding features between the steel strip winding reinforcement layer and the inner pipe and the outer covering pipe, and the metal strips can slip.

The present invention absorbs the existing metal strip spiral winding and reinforcing method, adopts the two kinds of winding and mixed reinforcement method, i.e., multi-layer metal strip cross reverse winding, and multi-layer metal strip co-directional winding with covering of the gap At the same time, a non-metallic glass fiber reinforcement layer or a high-density PE layer is added into the metal strip winding reinforcement layer to form a continuous reinforced flexible composite pipe, which is resistant to high pressure and external pressure. Moreover, the continuous reinforced flexible composite pipe has features of high-pressure resistance, no bonding between the metal strip reinforcement layers and simple production process, thereby greatly reducing the cost of manufacturing and equipment, and ensuring the flexibility and seismic resistance of the pipeline, and the continuous reinforced flexible composite pipe can be continuously produced according to the required length.

The above-mentioned embodiments are only a preferred solution of the present invention, and are not intended to limit the present invention in any way, and other variations and modifications are possible without departing from the technical solutions described in the claims.

What is claimed is:

1. A metal strip winding continuous reinforced thermoplastic composite pipe, comprising a three-layer structure of
   an inner pipe,
   a metal strip winding reinforcement layer and
   an outer covering pipe;
   wherein, the metal strip winding reinforcement layer comprises a plurality of multi-layer metal strips spirally wound around an outside of the inner pipe along an axial direction of the inner pipe, and a glass fiber reinforcement layer or a high-density PE (polyethylene) layer
   wherein, the metal strip winding reinforcement layer comprises at least a first and a second multi-layer metal strip group spirally wound around the inner pipe along the axial direction of the inner pipe;
   the first multi-layer metal strip group comprises a gap forming strip and a gap covering strip, wherein, the gap forming strip and the gap covering strip are spirally wound around the inner pipe unidirectionally along the axial direction of the inner pipe;
   the second multi-layer metal strip group, and other multi-layer metal strip groups in the metal strip winding reinforcement layer each comprise a gap forming strip and a gap covering strip, wherein the gap forming strip and the gap covering strip in the second multi-layer metal strip group and in other multi-layer metal strip groups are multi-layer metal strips alternatingly wound spirally around the inner pipe in opposite directions along the axial direction of the inner pipe;
   winding directions of the gap covering strip in the first multi-layer metal strip group and the gap forming strip in the second multi-layer metal strip group are opposite;
   each multi-layer metal strip within the metal strip winding reinforcement layer is formed by winding each multi-layer metal strip spirally around the inner pipe along the axial direction of the inner pipe; and
   wherein, the glass fiber reinforcement layer or the high-density PE (polyethylene) layer is located between adjacent multi-layer metal strip groups for separating adjacent multi-layer metal strip groups.

2. The metal strip winding continuous reinforced thermoplastic composite pipe according to claim 1, wherein, in the metal strip winding reinforcement layer, the glass fiber reinforcement layer or the high-density PE (polyethylene) layer comprises a fiber glass strip or a high-density PE (polyethylene) strip spirally and overlappingly wound around the inner pipe along the axial direction of the inner pipe.

3. The metal strip winding continuous reinforced thermoplastic composite pipe according to claim 1, wherein in the metal strip winding reinforcement layer, each gap forming strip and each gap covering strip is wound in a continuous, spiral and parallel form along the axial direction of the inner pipe.

4. The metal strip winding continuous reinforced thermoplastic composite pipe according to claim 1, wherein, in the metal strip winding reinforcement layer, there are no bonding features including welding or restraint between any two adjacent metal strip layers, and each of the any two adjacent metal strip layers is capable of relatively slipping within the at least first and second multi-layer metal strip groups.

5. The metal strip winding continuous reinforced thermoplastic composite pipe according to claim 1, wherein, in the metal strip winding reinforcement layer, a cross section of each of the gap forming strips and the gap covering strips of the at least first and second multi-layer metal strip groups is rectangular.

6. The metal strip winding continuous reinforced thermoplastic composite pipe according to claim 1, wherein, in the metal strip winding reinforcement layer, a width and a thickness of each of a plurality of metal strip layers within a multi-layer metal strip group are the same, and the width and the thickness of each of a plurality of lamer metal strip layers in different multi-layer metal strip groups are different.

7. The metal strip winding continuous reinforced thermoplastic composite pipe according to claim 1, the glass fiber reinforcement layer or the high-density PE (polyethylene) layer in the metal strip winding reinforcement layer is wound or extruded on an outside of the first multi-layer metal strip group.

8. The metal strip winding continuous reinforced thermoplastic composite pipe according to claim 1, the glass fiber reinforcement layer in the metal strip winding reinforcement layer is a solid pipe formed by winding and/or bonding a glass fiber pre-impregnated strip.

9. The metal strip winding continuous reinforced thermoplastic composite pipe according to claim 1, wherein, in the meta strip winding reinforcement layer, a material for making the at least first and second multi-layer metal strip groups is a carbon steel or a stainless steel.

10. The metal strip winding continuous reinforced thermoplastic composite pipe according to claim 1, wherein the metal strip winding reinforcement layer is located inside the outer covering pipe and is wrapped by spiral, overlapping, winding plastic strips or fiber ribbons.

11. The metal strip winding continuous reinforced thermoplastic composite pipe according to claim 1, wherein there are no bonding features between the metal strip winding reinforcement layer and the inner pipe and the outer covering pipe, and the metal strip winding reinforcement layer is capable of relatively slipping between the inner pipe and the outer coating pipe.

12. The metal strip winding continuous reinforced thermoplastic composite pipe according to claim 1, wherein the inner pipe and the outer covering pipe are thermoplastic pipes.

* * * * *